United States Patent
Otta et al.

(10) Patent No.: US 11,867,272 B2
(45) Date of Patent: Jan. 9, 2024

(54) GEARWHEEL FOR REDUCING STRUCTURE-BORNE SOUND IN ELECTRIC DRIVES

(71) Applicant: ZF FRIEDRICHSHAFEN AG, Friedrichshafen (DE)

(72) Inventors: Josef Otta, Friedrichshafen (DE); Christoph Schwarzbauer, Windorf (DE); Anton Sänger, Passau (DE); Johannes Luka, Untergriesbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/879,423

(22) Filed: Aug. 2, 2022

(65) Prior Publication Data
US 2023/0049420 A1 Feb. 16, 2023

(30) Foreign Application Priority Data
Aug. 10, 2021 (DE) .................... 10 2021 208 662.4

(51) Int. Cl.
*F16H 55/14* (2006.01)
*F16H 55/17* (2006.01)
*B60K 1/00* (2006.01)

(52) U.S. Cl.
CPC ............. *F16H 55/14* (2013.01); *F16H 55/17* (2013.01); *B60K 2001/001* (2013.01)

(58) Field of Classification Search
CPC ...... F16H 55/14; F16H 55/17; F16H 57/0031; F16H 57/01; F16H 2057/012; F16H 57/021; B60K 2001/001
See application file for complete search history.

(56) References Cited

U.S. PATENT DOCUMENTS

| | | | |
|---|---|---|---|
| 2004/0226396 A1* | 11/2004 | Noguchi | F16H 55/06 74/DIG. 10 |
| 2014/0007741 A1* | 1/2014 | Vanderzyden | F16H 3/72 74/432 |
| 2016/0290469 A1* | 10/2016 | Lemmers, Jr. | F16H 55/17 |
| 2016/0290489 A1* | 10/2016 | Lemmers, Jr. | F16H 57/08 |
| 2020/0224629 A1 | 7/2020 | Fujita | |

FOREIGN PATENT DOCUMENTS

| | | | |
|---|---|---|---|
| DE | 908317 | 4/1954 | |
| DE | 4211318 | 2/1993 | |
| DE | 102014107924 | 12/2014 | |
| DE | 102015201873 | 8/2016 | |
| DE | 102017113900 | 1/2018 | |
| DE | 102018221837 A1 * | 6/2020 | F16H 55/17 |
| EP | 3667124 | 6/2020 | |

OTHER PUBLICATIONS

Office Action corresponding German Patent Application No. 10 2021 208 662.4.

* cited by examiner

*Primary Examiner* — Zakaria Elahmadi
(74) *Attorney, Agent, or Firm* — Cozen O'Connor

(57) ABSTRACT

Gearwheel for structure-borne sound reduction in electric drives, having a toothed ring and a wheel hub, which has a structured annular or corrugated web between a shaft seat and the toothed ring. The web has a structure designed with deviations from uniform stiffness and mass distribution about an axis of rotation of the gearwheel, and has an axial symmetry to avoid imbalance. The gearwheel has a two-fold, four-fold, six-fold or eight-fold cyclic axial symmetry.

13 Claims, 4 Drawing Sheets

GEARWHEEL FOR REDUCING STRUCTURE-BORNE SOUND IN ELECTRIC DRIVES

BACKGROUND OF INVENTION

1. Field of the Invention

The disclosure relates to a gearwheel for reducing structure-borne sound in electric drives. The disclosure relates to electric drive engineering involving solid lightweight transmission elements, particularly in the automotive industry in applications for electric mobility.

2. Description of Related Art

Vehicles are becoming quieter and quieter, especially since electric and hybrid drives have been used. As a result, the drivers and occupants of a vehicle are becoming more sensitive to other abnormal noises, which were previously covered by the background noise level of the internal combustion engine (referred to as masking noise).

Owing to the lack of masking noise of the internal combustion engine in electric vehicles, the transmission noise can become a significant disturbance factor, even for "untrained" ears. For this reason, the design of the transmission and individual gearwheel bodies is one of the greatest challenges in the development of complete electric drives owing to the contradictory requirements of forging, hardening, fatigue strength, limitation of mass, assembly, oiling, micro- and macro-geometry of gearing and, in particular, transmission acoustics.

In electric drives, the mass of the overall system plays a very important role. Consequently, the drive gearwheels require a lightweight design and a reduction in the mass of the wheel hub by the creation of a mass-reduced web between the shaft seat and the toothed ring.

Furthermore, the wide operating range of an electric motor, which has a maximum torque in a wide speed range and therefore requires only a small number of gears, has the effect, in a typical single-speed configuration, that all the gears mesh with one another without interruption and, as a result of the high speeds, have to withstand a greatly increased number of rollovers. On account of the durability specifications for transmissions in electric vehicles, this leads to significantly increasing requirements on the stability of the individual gearwheels. This can be enhanced by increasing the gearwheel diameter and/or the tooth width.

Given the abovementioned boundary conditions, it has been found in structure-borne sound measurements on an electric drive that the "NVH" behavior (noise vibration harshness) in the individual transmission stages is caused in particular by noise peak levels of wheel body resonant vibrations.

The prior art discloses various solutions intended to take into account the lightweight construction requirements of gearwheels. A disclosure in this respect has been made by EP 3 667 124 A1, in which the gearwheel hub is connected between the metallic shaft seat and the metallic toothed ring by a web of plastic (synthetic resin) having an equally distributed hole structure and engagement in a groove of each individual tooth region of the toothed ring. The non-monolithic construction is regarded as disadvantageous for the stiffness and fatigue strength of the gearwheel.

Furthermore, DE 10 2014 107 924 A1 discloses a gearwheel arrangement for reducing noise in gearwheels, in which a main gearwheel comprising a gearwheel rotatable in the circumferential direction on the main gearwheel hub is described, wherein the rotatable gearwheel is prestressed by a groove ring machined into the main gearwheel hub in order to reduce the gearwheel backlash when meshing with a mating gearwheel.

With the same intention, DE 10 2017 113 900 A1 discloses a gearwheel arrangement with split cylindrical gearing with a main gearwheel and a rotatable gearwheel, wherein the rotatable gearwheel is placed on the hub of the main gearwheel and has an axis of rotation that is different from the main gearwheel, thus making it possible, with an adjustable angle of rotation, to compensate for a certain eccentricity of the gearwheel and to reduce running noises. With all the previous design measures, there is a departure from a monolithic design of the gearwheel and, in the reduction of structure-borne sound in the transmission, reliance is placed exclusively on minimizing the tooth backlash.

SUMMARY OF THE INVENTION

An underlying aspect of the invention is a way of reducing structure-borne sound in transmissions for electric vehicles that effectively reduces resonance-induced excessive noise while maintaining the desired lightweight construction of the gearwheel bodies.

One aspect of the invention is a gearwheel of lightweight construction for structure-borne sound reduction in electric drives, having a toothed ring and a wheel hub, which has a structured annular or corrugated web between a shaft seat and the toothed ring, in that the web has a structure which is designed with deviations from uniform mass distribution about an axis of rotation of the gearwheel, and has an axial symmetry to avoid imbalances.

As a deviation from the uniform mass distribution, there is advantageously in the structure of the web a two-fold rotational symmetry of the mass distribution with respect to the axis of rotation.

In this case, the web of the gearwheel, in particular, has adjacent, differently structured sectors with different mass distributions, which are present in pairs and can be brought into overlap after a rotation of 180° about the axis of rotation of the gearwheel. The differently structured sectors are preferably designed successively as one-quarter, one-sixth or one-eighth circular sectors.

In a one aspect of the invention, the different mass distribution in the sectors can be set by varying the position, number or size of apertures or holes or combinations of these variations of the mass distribution of the web.

In one aspect of the invention, the different mass and stiffness distribution is set by varying the position, number or size of ribs or webs or a combination of these variations.

In a further configuration of the different mass distribution, the different mass and stiffness distribution of the web can be produced by varying the position, number or size of pockets or beads or other structures of wavy design or combinations of these variations.

It is furthermore advantageous to carry out the structuring of the web by a combination of at least two of the structures comprising apertures, holes, ribs, spokes or pockets, beads or other corrugated structures.

The formation of apertures, holes, ribs, spokes or pockets, beads or other corrugated structures can expediently be produced by additive or subtractive methods of lightweight gearwheel construction technology.

It is also found to be advantageous if remaining physical structures of the web are provided with reinforced, beveled or rounded root regions at the shaft seat and at the toothed ring.

One aspect of the invention is based on the insight that, in the case of lightweight gearwheels, the mass of the gearwheel is concentrated mainly outside the axis of rotation and, on account of the weight-optimized design of the wheel body, relatively low natural frequencies of the gearwheel bodies are produced, symmetrical eigenmodes of the gearwheel body being excited to oscillate particularly easily by excitation of teeth.

Therefore, a way of suppressing the symmetrical eigenmodes was sought.

One aspect of the invention is influencing the resonance behavior by selectively introducing a non-uniform mass and stiffness distribution about the axis of rotation of the gearwheel.

The solution was found in that the symmetrical eigenmodes are separated and distributed between different frequencies by non-cyclic geometry between the toothed ring and the hub. For the configuration of the non-cyclic wheel hub structure, there is the additional boundary condition that no additional imbalance about the axis of rotation of the gearwheel be introduced as a result of the modified mass and stiffness distribution. For this purpose, the wheel body geometry requires at least two-fold rotational symmetry.

For the deviation from the cyclic uniform mass distribution, the following approaches exist in principle in the manufacture of a gearwheel or its hub, especially if the latter is designed as an approximately annular web between the shaft seat and the toothed ring:

- a non-cyclic position, shape or size of holes (arbitrarily produced apertures or openings),
- a non-cyclic position, shape or size of successive ribs or spokes, or
- a wavy design of the web of non-cyclically successive beads, pockets or similar structures.

Moreover, combinations of at least two of these approaches are possible.

The structures of the web on the gearwheel hub which deviate from cyclicity or symmetry should be interpreted as follows. There is no rotational symmetry in the narrower sense, but only rotational symmetry in the wider sense, i.e. the structures of the web have an even-numbered order (C=2n, where n=1, 2, 3, . . . ) with respect to the axis of rotation of the gearwheel. This means that when at least two different structures are formed, the respective structure must be brought into congruence with an identically formed structure after a rotation of the gearwheel by φ=180°. For non-cyclic mass distribution, at least two different mass distributions must be formed in adjacent sectors of the wheel hub.

This type of abovementioned cyclicity deviations, which splits at least two natural frequencies of the gearwheel into oscillation modes of different frequencies, makes it possible to effectively reduce resonance-induced excessive noise. If the split frequencies are far enough apart, this reduces superposition of the symmetrical natural frequencies, thereby reducing the resonance peaks.

One aspect of the invention provides a new way of reducing structure-borne sound in transmissions for electric vehicles which, while maintaining a desired lightweight construction of the gearwheels, minimizes the resonance-induced excessive noise or suppresses it to such an extent that the predetermined limit values of the structure-borne sound measurements of the transmission are not exceeded.

The gearwheel is advantageously designed as a cylindrical wheel.

In addition, the invention relates to a transmission device having at least two cylindrical wheels for transmitting a rotational speed and/or a torque of an electric motor, wherein the gearwheel is designed as a cylindrical wheel and as described.

The invention also relates to an electric axle drive for a motor vehicle having at least one electric machine, a transmission device, a differential and an inverter. The electric axle drive is distinguished by the fact that the transmission device is designed as described.

In addition, the invention relates to a motor vehicle comprising an electric axle as described and/or a transmission device as described.

BRIEF DESCRIPTION OF THE DRAWINGS

The invention is explained in greater detail below with reference to exemplary embodiments and figures. More specifically.

DETAILED DESCRIPTION OF THE PRESENTLY PREFERRED EMBODIMENTS

Figure 1:
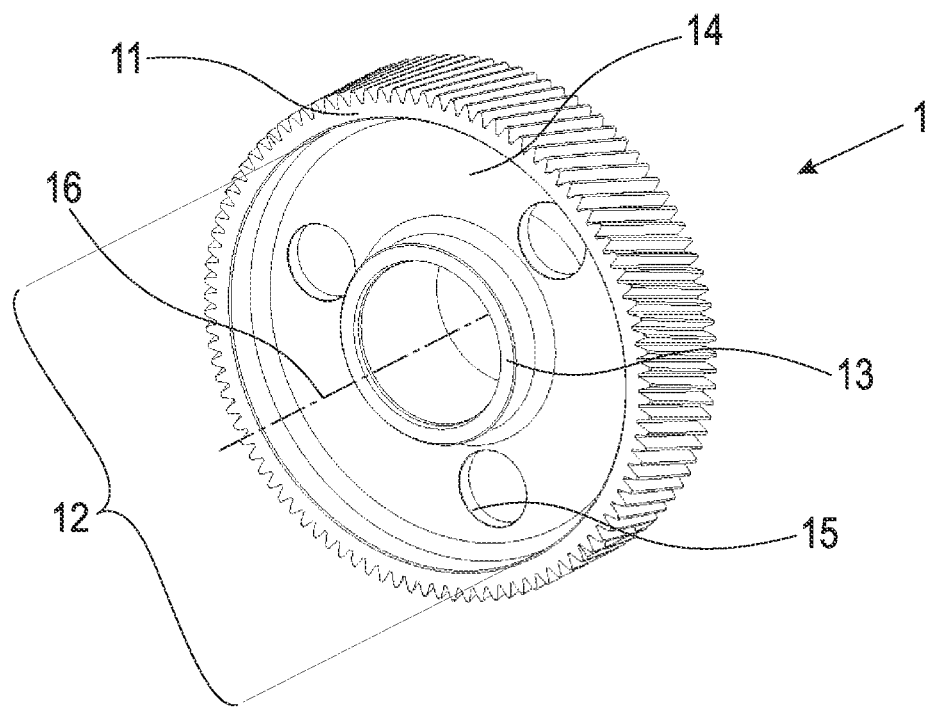
FIG. 1: is a schematic illustration of a conventional gearwheel body according to the prior art in an embodiment which is common for lightweight construction.

FIGS. 1a, 1b serve to explain the basic structure and the shaping of a gearwheel body of lightweight construction according to the known prior art. As illustrated in FIG. 1A, the gearwheel 1 comprises a toothed ring 11 and a gearwheel hub 12.

Figure 2:
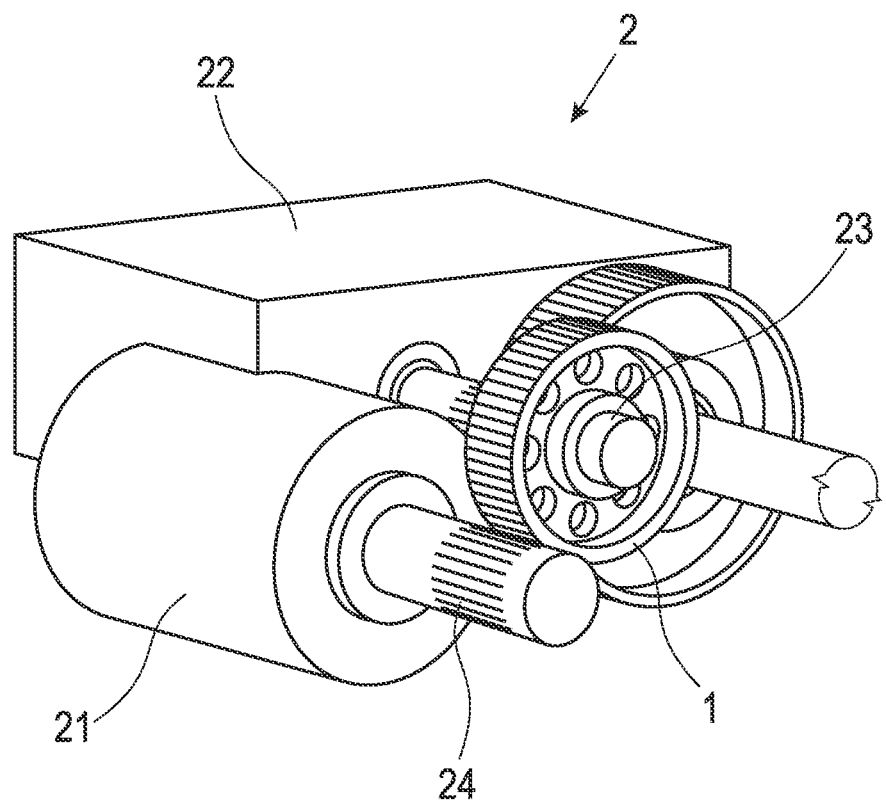
FIG. 2: is an exemplary schematic illustration of an electric drive with an electric motor and a transmission using conventional lightweight gearwheels.

The toothed ring 11 is provided with helical toothing to enlarge the contact area when meshing with a second gearwheel, such as the drive shaft 24 of an electric motor 21 (illustrated only in FIG. 2). To reduce the weight with a view to lightweight construction, the gearwheel hub 12 is of narrower design than the toothed ring 11, and therefore an annular-disk-shaped web 14 (FIG. 1) or corrugated web (FIGS. 7A, 7B) is formed between a shaft seat 13 and the toothed ring 11, and is additionally reduced in weight by holes 15. The holes 15 are uniformly distributed in the conventional way, i.e. they recur cyclically, are of the same size and at the same radial and tangential spacing, about the axis of rotation 16 of the gearwheel 1.

In order to explain the overall problem of the structure-borne sound emission of an electric drive, FIG. 2 illustrates an electric drive 2 according to the prior art in a simplified, stylized form. An electric motor 21 is integrated into a transmission block 22, wherein individual gearwheels 1, constructed in a conventional lightweight design, are guided on the transmission block 22 and one of the gearwheels 1 meshes directly with the motor shaft pinion 24.

Figure 3A:
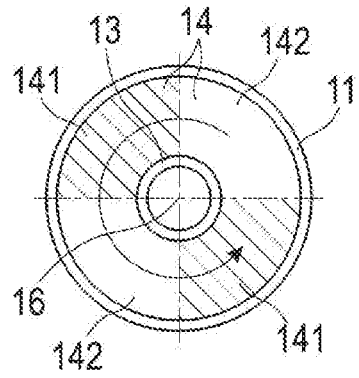
FIG. 3A-3C: are schematic illustrations of gearwheel bodies for achieving a variation of the mass and stiffness distribution while maintaining a two-fold rotational symmetry.
Figure 3B:
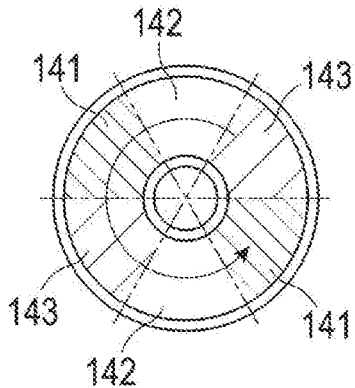
Figure 3C:
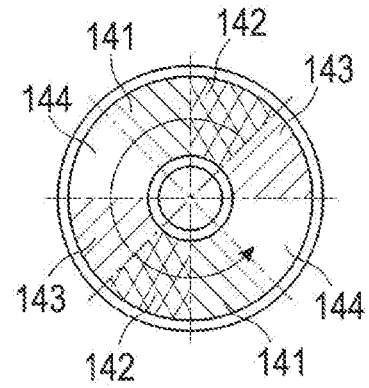

The solution to the problem according to one aspect of the invention is shown in a schematic illustration in FIG. 3. On a gearwheel 1 with the toothed ring 11, the wheel hub 12 (as indicated in FIG. 1A-1C) is subdivided in stylized form into a shaft seat 13 and a web 14, and the web 14 is influenced in a selective manner by a change in the mass and stiffness distribution in order to separate and thus reduce the resonances of the symmetrical eigenmodes in certain speed and load ranges of the electric drive 2. The boundary condition for this measure is the avoidance of imbalance of the gearwheel 1. The solution lies in the fact that the absolute uniform distribution of mass or rotational symmetry in the narrow sense is modified into a rotational symmetry in the wider sense. For this purpose, the web 14 of the gearwheel 1 is divided into differently structured sectors 141, 142, ..., which each have an axially symmetrically identical counterpart. Differently structured means that the adjacent sectors 141, 142, . . . have mutually different mass distributions (a mass difference) which, when the gearwheel 1 is rotated about the axis of rotation 16, generates different eigenmodes at different frequencies, ensuring that they are not superposed to form resonance peaks. As a result of the sectors 141, 142, . . . with the same structure lying axially symmetrically opposite one another in pairs, no imbalance arises here.

The individual partial figures A, B and C in FIG. 3 show possible subdivisions of the web 14 by different numbers of sectors, with figure a having a web structure with two adjacent, different sectors 141 and 142, each in quarter-circle format, which can be brought into congruence with two further sectors 141 and 142, which are structured in the same way, after a rotation of 180° about the axis of rotation 16. Partial figure B shows the further development of this structuring of the web 14 for three differently structured sectors 141, 142 and 143 (one-sixth circular sector) and partial figure C has four different (one-eighth circular) sectors 141 to 144, for which the overlapping of the paired structures can likewise be produced after a 180° rotation of the gearwheel 1. Structuring constructed in this way (with unequal stiffness and mass distribution) produces two-fold rotational symmetry of the web 14 or of the gearwheel 1.

Since, as an additional boundary condition, the aim is to achieve a further weight reduction with a view to lightweight design while maintaining sufficient stiffness of the gearwheel 1, the variations shown in FIGS. 4A-4C and FIGS. 5A-5C, obtained by different types of apertures in the material of the web 14, present themselves for the choice of the structuring of the web 14.

Figure 4A:
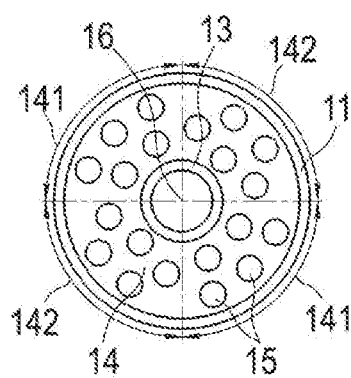
FIG. 4A-4C: are three specific gearwheel bodies with sectors with different mass distribution (A) by different positioning of an equal number of holes in two adjacent sectors, (B) by different positioning of different numbers of holes in three successive sectors and (C by different positioning of holes of different size and number in four successive sectors.
Figure 4B:
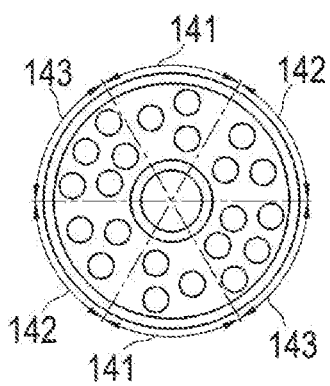
Figure 4C:
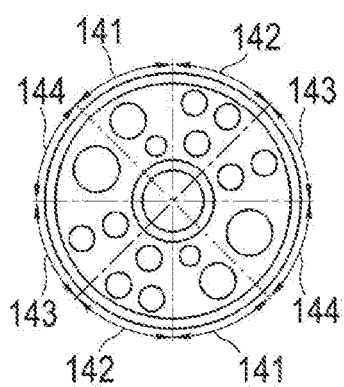

For this purpose, the apertures in FIG. 4A-4C are achieved by a number of holes 15, preferably drill holes, which are produced in the sectors 141, 142, ..., divided up analogously to FIG. 3, either by means of differently positioned holes 15 of the same size and number (FIG. 4A) or by sectors 141 to 143 according to FIG. 4B with holes 15 of the same size but of different number and position, or sectors 141 to 144 according to FIG. 4C with holes 15 of different size, number and position. Owing to the novel possibilities in the lightweight construction of gearwheels 1 by additive and subtractive production methods, the examples in FIG. 4A-4C are in no way restricted to circular holes 15 but can be replaced by, or combined with, apertures of any desired shape, such as rounded triangles, quadrilaterals, any desired polygons, ovals, etc.

The same applies to the way in which ribs or spokes 17 are designed in accordance with the following FIG. 5 if these are produced by apertures in the web 14.

Figure 5A:
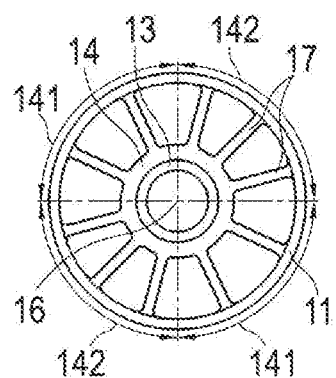
FIG. 5A-5C: are three gearwheel bodies with of sectors with different mass distribution (A) by different positioning of a number of spokes (or ribs) in two adjacent sectors, (B) by different positioning of different numbers of spokes (or ribs) in three successive sectors and (C) by different positioning of spokes (or ribs) in different sizes (or thicknesses) and numbers in four successive sectors.
Figure 5B:
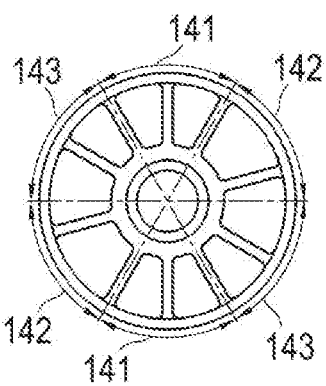
Figure 5C:
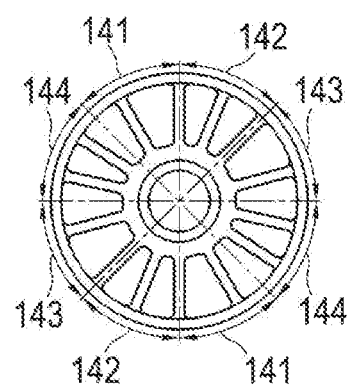

In FIG. 5A-5C, the web 14 of the gearwheel 1 has been structured with ribs or spokes 17, produced according to the principle of FIG. 3. Each of FIGS. 5A, 5B and 5C is divided into two, three or four sectors 141 to 144, as described with reference to the preceding FIGS. 3 and 4, wherein here the different stiffness and mass distribution is accomplished by means of different position, size (thickness) and number of the ribs/spokes 17 in the individual sectors 141, 142, . . . .

Figure 6:
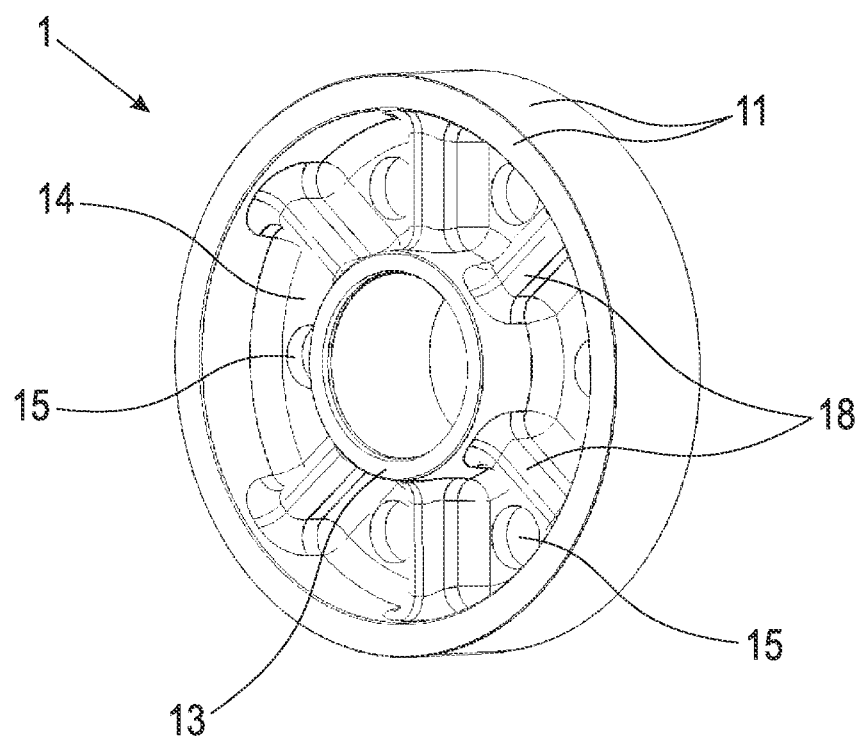
FIG. 6: shows a gearwheel according to a combination of FIG. 4A and FIG. 5A.

Instead of ribs or spokes 17, wavy structures of the web 14 are also possible in order to produce non-uniform stiffness and mass distributions, in particular by the formation of pockets (not shown) or beads 18 (indicated only in FIG. 6).

FIG. 6 shows an optimized design of the gearwheel 1 according to the principles described above, wherein the toothed ring 11 is shown in simplified form without toothing. In this example, the web 14 is formed as a combination of the sector subdivisions according to FIG. 4A and FIG. 5A. Two sectors 141 and 142 (not designated in FIG. 6) situated opposite one another in pairs can be seen, each being formed using holes 15 and beads 18. The beads 18 can also be designed as thickened portions in the sense of ribs or spokes 17. As already shown in the case of the spokes 17 in FIG. 5, it is worthwhile to provide thickened root regions at the shaft seat 13 and at the toothed ring 11 in the case of the beads 18, just as much as in the case of ribs or spokes 17, in order to maintain or increase stiffness. Similarly, circular holes 15 can be replaced by apertures of any other desired shape, provided that the fatigue strength and/or stiffness requirements are met.

With the above-described aspects of the invention, the customary uniform distribution of mass in a gearwheel 1 of lightweight design is modified in a selective manner, primarily in the mass-reduced web 14, by apertures and shaped portions in such a way that these lead to differences in stiffness and mass distribution and noncyclic structural formations along the tangential direction of the web 14, and the essential additional condition of avoiding imbalance during rotational movement is met. However, the embodiments are not restricted to the stated web configurations, but can also extend the reduced cyclicity or symmetry of the uniform distribution of stiffness and mass to the entire gearwheel body, as long as a stiffness and mass distribution with two-fold rotational symmetry is set overall.

Figure 7A:
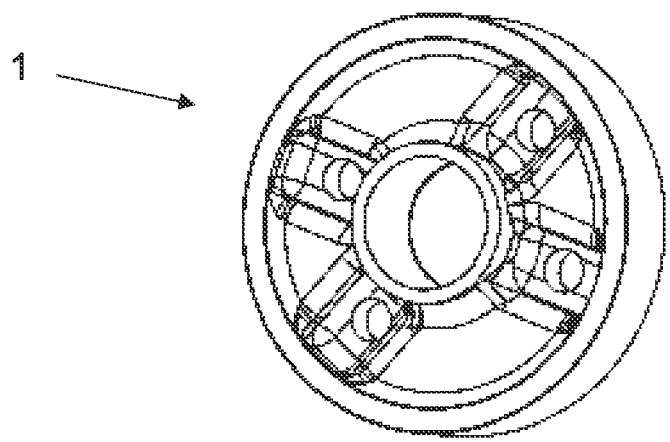
FIG. 7A-7B: are a gearwheel with a corrugated or, for example, trapezoidally shaped web.
Figure 7B:
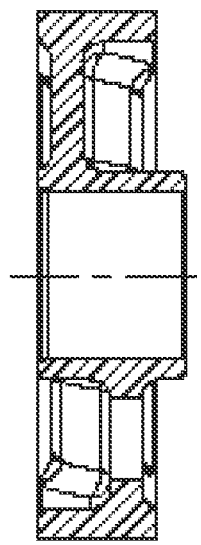

FIG. 7A, 7B show an optimized design of the gearwheel 1 with a corrugated or, for example, trapezoidally shaped web.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gearwheel for structure-borne sound reduction in electric drives, comprising:
a toothed ring; and
a wheel hub, which has a structured annular or corrugated web between a shaft seat and the toothed ring,
wherein the structured annular or corrugated web has a structure with deviations from uniform mass distribution about an axis of rotation of the gearwheel, and
wherein the structured annular or corrugated web has an axial symmetry to avoid imbalance,
wherein the structured annular or corrugated web has adjacent, differently structured sectors with different stiffness and mass distribution, which are present in pairs and can be brought into congruence after a rotation of 180° about the axis of rotation of the gearwheel.

2. The gearwheel as claimed in claim 1, wherein, as a deviation from a uniform stiffness and mass distribution, there is in the structure of the structured annular or corrugated web a two-fold rotational symmetry of stiffness and mass distribution with respect to the axis of rotation.

3. The gearwheel as claimed in claim 1, wherein differently structured sectors (are designed in succession as differently sized one-quarter, one-sixth, or one-eighth circular sectors.

4. The gearwheel as claimed in claim 1, wherein a different stiffness and mass distribution is set by varying a position, a number or a size of apertures or holes or combinations of these variations of stiffness and mass distribution of the structured annular or corrugated web.

5. The gearwheel as claimed in claim 1, wherein a different stiffness and mass distribution is set by varying a position, a number or a size of ribs or webs or combinations of these variations of stiffness and mass distribution of the structured annular or corrugated web.

6. The gearwheel as claimed in claim 1, wherein a different stiffness and mass distribution is set by varying a position, a number or a size of pockets or beads or other structures of wavy design or combinations of these variations of stiffness and mass distribution of the structured annular or corrugated web.

7. The gearwheel as claimed in claim 4, wherein the structuring of the structured annular or corrugated web is formed by a combination of at least two of the structures comprising apertures, holes, ribs, spokes, pockets, beads or other corrugated structures.

8. The gearwheel as claimed in claim 4, wherein the structuring of the structured annular or corrugated web is produced by apertures, holes, ribs, spokes, pockets, beads or other corrugated structures by additive or subtractive methods of lightweight gearwheel construction technology.

9. The gearwheel as claimed in claim 4, wherein remaining physical structures of the web are provided with reinforced beveled or rounded root regions at the shaft seat and at the toothed ring.

10. A transmission device comprising:
at least two cylindrical wheels configured to transmit a rotational speed and/or a torque of an electric motor, wherein at least one of the two cylindrical wheels is a gearwheel, comprising:
a toothed ring; and
a wheel hub, which has a structured annular or corrugated web between a shaft seat and the toothed ring,
wherein the structured annular or corrugated web has a structure with deviations from uniform mass distribution about an axis of rotation of the gearwheel, and
wherein the structured annular or corrugated web has an axial symmetry to avoid imbalance,
wherein the structured annular or corrugated web has adjacent, differently structured sectors with different stiffness and mass distribution, which are present in pairs and can be brought into congruence after a rotation of 180° about the axis of rotation of the gearwheel.

11. The transmission device as claimed in claim 10, wherein the transmission device is arranged in a vehicle.

12. An electric axle drive for a motor vehicle comprising:
at least one electric machine;
a transmission device comprising:
at least two cylindrical wheels configured to transmit a rotational speed and/or a torque of an electric motor, wherein at least one of the two cylindrical wheels is a gearwheel, comprising:
a toothed ring; and
a wheel hub, which has a structured annular or corrugated web between a shaft seat and the toothed ring,
wherein the structured annular or corrugated web has a structure with deviations from uniform mass distribution about an axis of rotation of the gearwheel, and
wherein the structured annular or corrugated web has an axial symmetry to avoid imbalance, wherein the structured annular or corrugated web has adjacent, differently structured sectors with different stiffness and mass distribution, which are present in pairs and can be brought into congruence after a rotation of 180° about the axis of rotation of the gearwheel;
a differential; and
an inverter.

13. The electric axle drive as claimed in claim 12, wherein the electric axle drive is arranged in the motor vehicle.

* * * * *